United States Patent [19]

Larson et al.

[11] Patent Number: 4,646,287

[45] Date of Patent: Feb. 24, 1987

[54] IDLE PERIOD SIGNALLING IN A PACKET SWITCHING SYSTEM

[75] Inventors: Mikiel L. Larson, St. Charles, Ill.; Anne A. Robrock, Milan, Italy; Wing N. Toy, Glen Ellyn, Ill.

[73] Assignee: AT&T Bell Laboratories, Murray Hill, N.J.

[21] Appl. No.: 679,456

[22] Filed: Dec. 7, 1984

[51] Int. Cl.[4] .......................... H04Q 11/04; H04J 3/24
[52] U.S. Cl. ........................................ 370/60; 370/94
[58] Field of Search .................. 370/60, 94, 58, 110.1, 370/111

[56] References Cited

U.S. PATENT DOCUMENTS

| | | | |
|---|---|---|---|
| 4,314,367 | 2/1982 | Bakka et al. | 370/60 |
| 4,488,288 | 12/1984 | Turner | 370/60 |
| 4,550,401 | 10/1985 | Spears | 370/60 |
| 4,561,090 | 12/1985 | Turner | 370/94 |
| 4,570,257 | 2/1986 | Olson et al. | 370/94 |

FOREIGN PATENT DOCUMENTS 0108028  5/1984  European Pat. Off.

OTHER PUBLICATIONS

A. Thomas et al., "Asynchronous Time-Division Techniques: An Experimental Packet Network Integrating Videocommunication", Proc. Int'l Switching Symposium, (Florence, IT, 5/7-11/84), Sess. 32C, Paper 2.
C.C.I.T.T. White Book V. VI, Part XIV, "Specifications of Signalling System No. 6", (Mar del Plata, 10/68), pp. 18-19, 32-37, 39-42, 44 and 76.
W. Boghdady et al., "A Technique for Fault-Detection and Performance Measurement in Data Communications Networks", Proc. IEEE Int'l Conf. on Comms., (Amsterdam, NL, 5/14-17/84), pp. 1366-1370.
A. G. Fraser, "Datakit—A Modular Network for Synchronous and Asynchronous Traffic", Int'l Conf. on Comms. Record, (Boston, MA, 6/10-14/79), pp. 20.1.1-20.1.3.
E. Szurkowski, "The Use of Multi-Stage Switching Networks in the Design of Local Network Packet Switches", IEEE Int'l Conf. on Comms., vol. 2 (1981), pp. 25.2.1-25.2.5.
J. F. Boyle et al., "Transmission/Switching Interfaces and Toll Terminal Equipment", The Bell System Technical Journal, vol. 56, No. 7 (Sep. 1977), pp. 1057-1097.
K. E. Fultz et al., "The T1 Carrier System", The Bell System Technical Journal, vol. 44, No. 7 (Sep. 1965), pp. 1407-1451.
Motorola Semiconductors Advance Information, "Multi-Protocol Communications Controller".

Primary Examiner—Douglas W. Olms
Assistant Examiner—Wellington Chin
Attorney, Agent, or Firm—David Volejnicek

[57] ABSTRACT

Trunk controllers (131) at each end of a trunk (118) of a packet switching system (FIGS. 1A and 1B) include an idle packet generator (1419) and an idle packet detector (1420). During idle periods, when packets are not available for transmission, the transmitter of each idle trunk controller generates and transmits a continuous sequence of flags (801/810) on the trunk. Periodically during the idle periods, the idle packet generator generates and provides to the transmitter (1403) for transmission an idle packet (800). An idle packet is structured like a normal packet. However, it is marked as an idle packet by the packet identification (PID) field (804) and contains pseudo-random bits in the data field (806). The receiver (1402) of the other trunk controller receives the idle code and packets including idle packets, discards the idle code, and sends all packets to the idle packet detector. The detector identifies idle packets by their PID field and discards them—blocks them from propagating further—while allowing other packets to pass therethrough.

40 Claims, 9 Drawing Figures

IDLE PACKET

IDLE PERIOD SIGNALLING IN A PACKET SWITCHING SYSTEM

TECHNICAL FIELD

The invention relates to packet switching systems, in particular to methods of and arrangements for idle period inter-node signalling in such systems.

BACKGROUND OF THE INVENTION

A packet switching system, such as may be used in telephony, is generally made up of a plurality of packet switching nodes interconnected by communication links such as telephone trunks. A packet switching node commonly comprises a packet switching network for selectively connecting various of its input ports to various of its output ports; link controllers each for interfacing a communication link to an input port and an output port of the packet switching network; and a central processor for controlling the operation of the switching node. Such packet switching nodes and systems are known in the art. An example thereof is disclosed in the copending U.S. patent application of Jonathan S. Turner, entitled "An Interface Facility for a Packet Switching System", Ser. No. 392,222, filed on June 25, 1982, issued on Dec. 11, 1984, as U.S. Pat. No. 4,488,289, and assigned to the same assignee as this application.

Packets are commonly transmitted across the links between nodes in packet switching systems only when particular tasks need to be performed in the system or when communication data are available for transmission; otherwise, no packets are transmitted and the links are idle. Tasks that require transmission of packets include call path setup tasks and various maintenance tasks. Data is commonly available for transmission in bursts, such as when the parties to a telephone call are talking.

Often it is undesirable to leave the interconnecting links idle. For example, it is desirable to periodically make a transmission across a link to assure the receiving node that the transmitting node and the interconnecting link have not failed. Also, certain links include repeaters that continuously need to receive transmissions in order to maintain their synchronization with the pair of nodes that are interconnected by the link. For such reasons, certain link communication protocols also require that transmissions across the link be made at least periodically, and they signal link communication errors if the required transmissions are not detected.

For these purposes, the prior art has suggested transmitting an idle code on the links during idle periods when no packets are available for transmission. Such an idle code may take the form of a rest configuration byte, which is a predetermined sequence of bits recognized by the receiving node as idle code. A rest configuration byte may be, for example, a packet start and stop flag. As the name indicates, the flag is a predetermined sequence of bits that signals the beginning or end of a packet.

Continuously repeated transmissions of idle code create certain problems, however. For example, a receiving node cannot determine from receipt of idle code whether the transmitting node is functional or failed and stuck in an idle code-transmitting mode. Certain idle codes, for example those made up of all zeros or all ones, fail to satisfy the synchronization needs of repeaters, because repeaters commonly synchronize their operation to transitions between received bit signals and hence they need to detect transitions between zeros and ones. Furthermore, certain link protocols derive meaning from bit patterns, such as the repeated occurrence of a given bit value in every nth transmitted bit, and these link protocols may find unintended meaning in continuously repeated transmissions of idle code. Also, transmissions on a link of repeating patterns often cause crosstalk on adjacent links, thereby degrading the quality of communications on those links.

In summary, transmissions are desirable or necessary during idle periods on links that interconnect nodes in packet switching networks, but the prior art approach of transmitting a continuous sequence of idle code during idle periods often does not satisfy link requirements, and in certain applications creates additional problems.

SUMMARY OF THE INVENTION

The present invention is directed to solving these and other disadvantages of the prior art. According to the invention, an arrangement for controlling a link, such as a trunk, of a packet switching system includes apparatus that occasionally transmits on the link a packet of a predetermined type, and also includes apparatus that discards packets of the predetermined type that are received on the link. Thus, a packet switching system having two portions, such as nodes, interconnected by a link has at one portion apparatus that occasionally transmits on the link a packet of the predetermined type, while it has at the other portion apparatus that discards the packets of the predetermined type that it receives on the link. A method of signalling is thereby established in the packet switching system that involves occasional transmissions on the link between the portions of the switching system of a packet of a first, predetermined, type and discarding of packets of the first type received on the link. Preferably, the packets of the predetermined type are marked by their packet identifier as idle packets so that they may be identified thereby as idle packets, and they are transmitted on the link periodically during idle periods, when no other types of packets are available for transmission. Also preferably, between transmissions of idle packets the idle periods are used for transmissions of idle code such as a continuous sequence of packet flags. The idle code is likewise discarded when it is received.

The transmissions of idle packets serve to condition the link during idle periods, by providing such transmissions on the link as are required by repeaters for synchronization and by link communication protocols for proper operation. When accompanied by transmissions of idle code, transmissions of idle packets serve to break up the repeating pattern of the idle code from which unintended meaning may otherwise be derived by link protocols. And in the case where the transmissions of idle code do not provide bit transitions, the transmissions of idle packets provide the bit transitions that are required for synchronization of equipment such as repeaters.

Furthermore, transmissions of idle packets provide a more reliable check on the functionality of the link and its control apparatus than do idle code transmissions. Because idle packets are packets, they simulate more accurately the operation of the link and its control apparatus in transmitting and receiving other types of packets. And because idle packet transmissions represent a break in the idle code sequence, transmissions of idle packets, or the lack thereof, serve to identify faulty link control equipment that is stuck in an idle code-transmitting mode. Furthermore, because they break up the pattern of idle code transmissions, idle packet transmissions help to eliminate the crosstalk on adjacent links that transmissions of a sequence of idle code often cause.

Yet despite the fact that they are packets, the use of idle packets does not add significant overhead to the operation of a packet switching system. Idle packets do not burden packet generating and transmitting circuitry, because they are generated and transmitted during idle periods, when no other packets are available for transmission, and because their generation and transmission merely temporarily replaces the generation and transmission of idle code. Furthermore, idle packets do not significantly burden packet receiving and processing circuitry, because they are received only during idle periods and instead of the idle code that would otherwise be received, and because they need to be processed only to the degree required for their identification, and thereafter they are discarded, thrown away, and thus do not have to be processed further in the manner of other packets.

These and other advantages and features of the present invention will become apparent from the following description of an illustrative embodiment of the invention taken together with the drawing.

DETAILED DESCRIPTION

Figure 1:
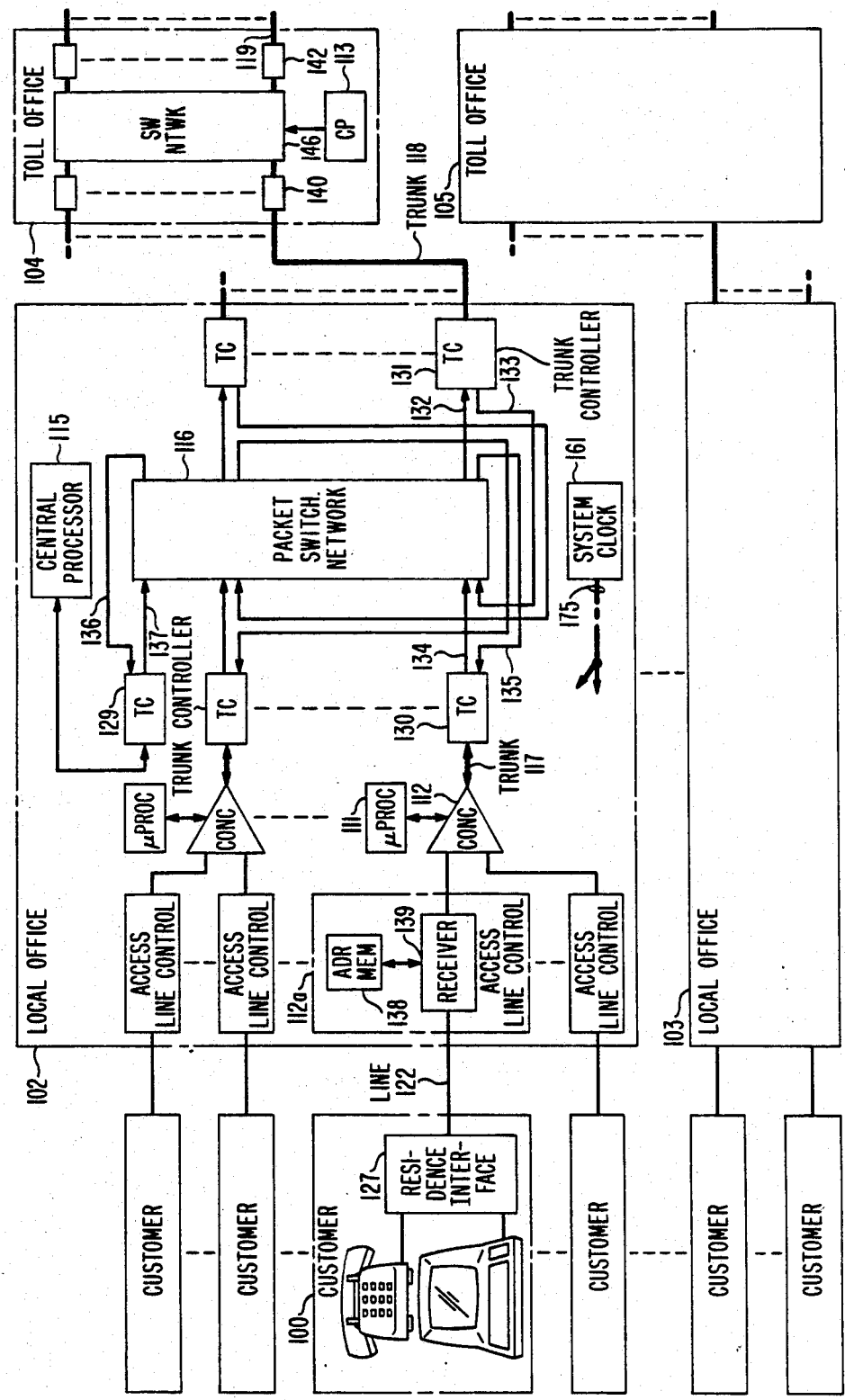
FIGS. 1A, and 1B are a block diagram of an illustrative packet switching system including an embodiment of the invention.

To illustrate an embodiment of the invention, FIGS. 1A and 1B show an illustrative packet switching system having a plurality of local offices 102, 103, 108 and 109, and a plurality of toll offices 104–107, serving a plurality of customers such as customers 100 and 110. Each office 102–109 is a node of the illustrative packet switching system of FIGS. 1A and 1B. The arrangement of FIGS. 1A and 1B to form a complete figure is indicated in FIG. 2.

As shown in FIG. 1A, local office 102 comprises a packet switching network 116 which terminates a plurality of trunk controllers, and which cooperates with central processor 115 via a central processor trunk controller 129 which is also connected to the switching network. Each trunk controller is tied into the switching network by unidirectional transmission media. Trunk controller 131, for example, receives information from switching network 116 via conductor 132 and transmits information to switching network 116 via conductor 133. Switching network 116 is interconnected to toll offices such as 104 by high speed trunks, with each trunk being terminated on each end at a port of a trunk controller.

On the customer side of local office 102, the local office is connected to customers via concentrators which are interconnected to the switching network via trunk controllers. A concentrator has an internal switching architecture similar to that of a packet switching network. A concentrator has a self-contained trunk controller which interfaces the concentrator to the attached trunk. The concentrator's trunk controller is similar to other trunk controllers, such as the trunk controller 131 which is described in greater detail later. Each concentrator has connected to it a microprocessor which is used in conjunction with the attached access line controller to perform the initial call setup sequences and to provide call supervision as a supplement to the inherent self-routing characteristics of the packets being transmitted through the packet switching system.

Illustratively, the customer units are connected to the concentrators by the access line controllers. Each access line controller contains logical address and control information which is stored in the access line controller by the controlling microprocessor. This logical address information is used to control the first portion of the route taken by the packets transmitted through the attached switching network via the interconnecting trunk controller. Each access line controller is connected to a resident interface contained within each customer unit via standard bidirectional transmission media. Packets are transmitted between the access line controllers and the resident interfaces using standard packet protocols.

All connections to a switching network, such as the representative switching network 116, are made through trunk controllers, as shown in FIGS. 1A and 1B. The trunk controllers receive information at a 1.544 Mb/s rate and transmit this information into the network at an 8 Mb/s rate. Illustratively, each trunk controller is capable of buffering four or more packets of information from the attached trunk. The buffering of packets at the input from the trunks is necessary because the packets may have to be delayed before they can be transmitted through the network. Buffering is also needed by the trunk controllers for information being received from the network before it can be retransmitted on the attached trunk. Illustratively, each trunk controller is capable of buffering up to 20 or more packets of information from the network while retransmitting packets on the trunk. Each trunk controller has one input connection and one output connection to switching network 116. For example, trunk controller 130 transmits information to switching network 116 via conductor 134 and receives data from switching network 116 via conductor 135, as shown in FIG. 1A.

Figure 2:
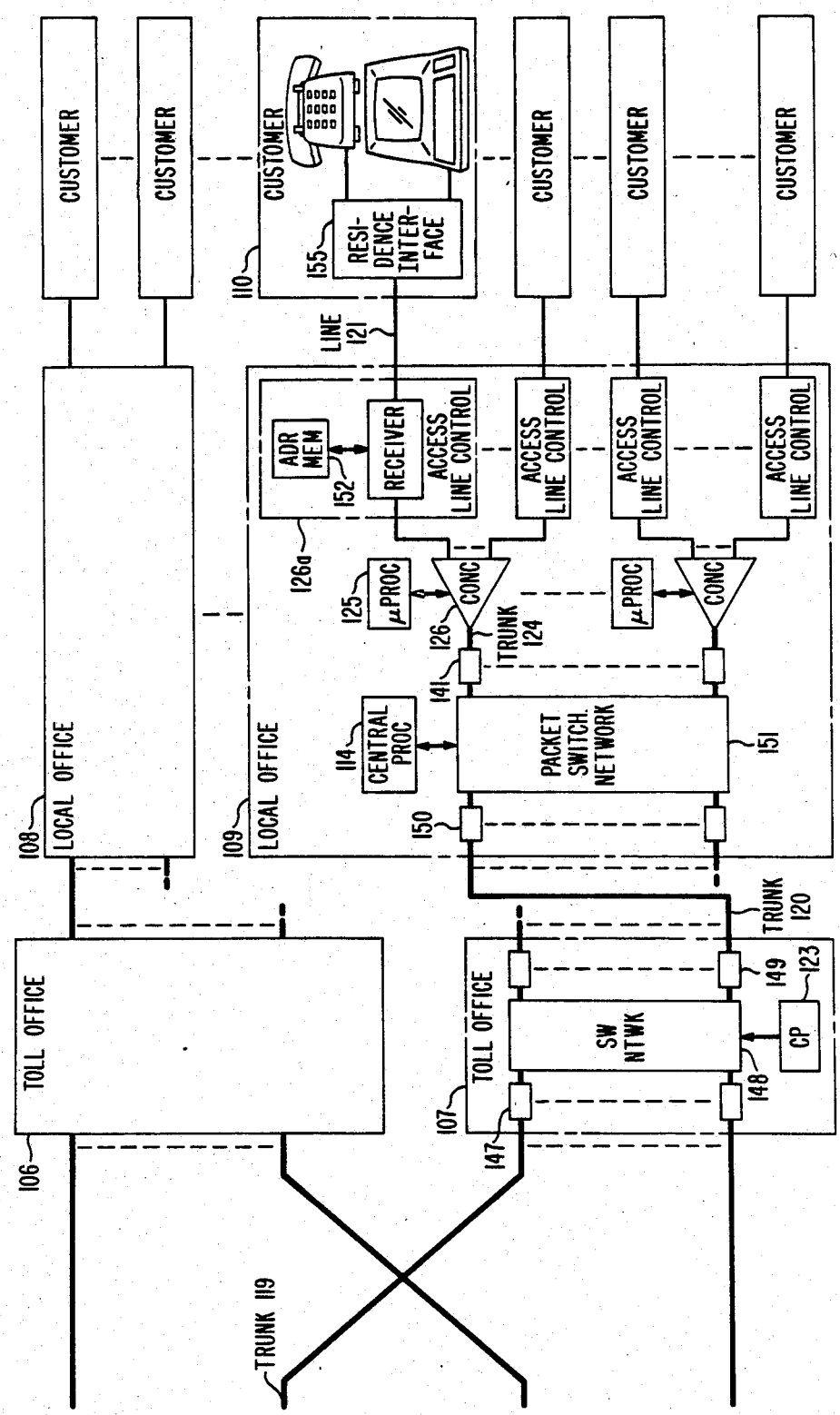
FIG. 2 is a diagram showing the arrangement of FIGS. 1A and 1B to form a complete figure.

Inter-office connections in the system of FIGS. 1A and 1B are accomplished by means of trunks. Since inter-office distances are commonly significant, repeaters (not shown) are included in trunks that are too long to get along without them. Each trunk is illustratively a T1 telephone digital transmission facility with a data transmission rate of 1.544 Mb/s as described in Boyle, Colton, Dammann, Karafin, and Mann, "Transmission/Switching Interfaces and Toll Terminal Equipment", 56 *The Bell System Technical Journal* 1057, 1058 (1977). A trunk controller is interfaced to the DSX-1 unit shown in FIG. 1 on page 1058 of the cited article.

The protocol of a T1 facility requires that bits be transmitted on the facility continuously, irrespective of whether or not there are any calls proceeding over the facility. But information is sent through an office's packet switching network only when real information, such as call signalling and call data, is available to be sent. A trunk controller therefore generates and transmits idle signals on the T1 facility when it has no real information to send. The idle signals are identified, removed from the incoming signal stream, and discarded, by the receiving trunk controller as part of the received signal processing.

Figure 3:
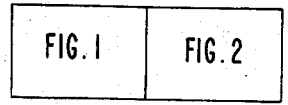
FIG. 3 is a block diagram of a trunk controller of the system of FIGS. 1A and 1B.

The structure of a representative trunk controller 131 is shown in FIG. 3. Other trunk controllers are similar to trunk controller 131. Trunk controller 131 receives packets from trunk 118 via receiver 1402, at input port 1430. Idle signals are removed from the incoming signal stream by the receiver 1402 and by idle packet detector 1420. Trunk controller 131 transmits packets to trunk 118 via transmitter 1403, at output port 1431. Idle period signals are inserted in the outgoing signal stream by the transmitter 1403 and by idle packet generator 1419. Trunk controller 131 transmits packets to switching network 116 via output circuit 1405, and receives packets from switching network 116 via input circuit 1406. Switch interface 1418 interfaces the input and output circuits to the switching network. Trunk controller 131 includes a memory 1401 containing buffers for temporarily storing received packets, and a translation table for converting logical addresses conveyed by packets that it receives over the trunk 118 into switch addresses which are used by the switching network 116 to route the packets to a destination trunk controller that subtends the switching network 116. Packets are transferred in and out of the four circular buffers in memory 1401 via control 1404. Control 1404 contains pointers to the circuit buffers that allow input circuit 1406, output circuit 1405, transmitter 1403, and receiver 1402 to read and write memory 1401.

Consider an example where signals are transferred from local office 102 to trunk 118. Serial bit streams representing packets from switching network 116 are received by input circuit 1406 via switch interface 1418. Input circuit 1406 forms this data into bytes. It then sends a write request via control bus 1414, and sends the bytes via data bus 1413, to control 1404. Control 1404 writes the information into memory 1401, via memory address bus 1417, memory data bus 1415, and memory control bus 1416. When an entire packet has been stored in memory 1401, input circuit 1406 transmits an end-of-packet signal to control 1404 via control bus 1414. Control 1404 then transmits a packet-available signal (FLAG DISABLE) to transmitter 1403 via TX CONTROL bus 1410.

During the time when packets are not available to transmitter 1403 for transmission, transmitter 1403 is generating and transmitting onto trunk 118 an idle code signal stream composed of packet flags. Occasionally during this time, idle packet generator 1419 generates an idle packet 800, shown in FIG. 8, less flags. This idle packet 800 is provided to transmitter 1403 for transmission on trunk 118 to break up the repeating pattern of transmitted flags. To inform transmitter 1403 of the availability of the idle packet, idle packet generator 1419 transmits a packet-available signal (FLAG DISABLE) to transmitter 1403 via TX CONTROL bus 1410.

Upon receipt of a packet-available signal and when it becomes ready to transmit a packet, transmitter 1403 makes a read request (READY) via TX CONTROL bus 1410. The originator of the packet-available signal, i.e., either the address control 1404 or the generator 1419, responds to the read request and sends the packet bytes to transmitter 1403. If the originator is the generator 1419, the packet bytes are sent via TX DATA OUT bus 1409b. If the originator is the control 1404, the packet bytes are sent via TX DATA IN bus 1409a, through generator 1419, and via TX DATA OUT bus 1409b. Transmitter 1403 transforms the bytes into a serial bit stream representing a packet, appends start-of-packet and end-of-packet flags thereto, and transmits the packet to trunk 118 at its output port 1431 at a 1.544 Mb/s rate.

Consider now an example where signals are transferred from trunk 118 to local office 102. Incoming serial bit steam is received by receiver 1402 at its input port 1430 in a serial fashion at a 1.544 Mb/s rate. Receiver 1402 discards all received flags and transforms the remaining serial information into bytes. Once it has assembled a byte, it transmits a write request (PACKET START), via RX CONTROL bus 1408, to control 1404. Receiver 1402 then writes the byte onto RX DATA IN bus 1407a.

Idle packet detector 1420 intercepts the write request and first byte of a packet written by the receiver 1402, and inspects the byte to determine if the packet is an idle packet. If the packet is identified as an idle packet, detector 1420 blocks the write request and packet bytes from reaching control 1404 and discards them. If the packet is not an idle packet, detector 1420 sends the write request to control 1404 over the RX CONTROL bus 1408 and allows receiver 1402 to write the packet bytes into memory 1401 via RX DATA IN bus 1407a, RX DATA OUT bus 1407b, and control 1404.

The location in memory 1401 that a packet byte is written into is designated by address pointers indicated by control 1404. The receiver 1402 continues to assemble packet bytes and write them into memory 1401 with the aid of control 1404 until receiver 1402 has transferred an entire packet into memory 1401. After receiver 1402 has received and written into memory 1401 an entire packet, it transmits an end-of-packet signal (negated PACKET START), via RX CONTROL bus 1408, to control 1404. Control 1404 then transmits a packet-available signal, via control bus 1412, to output circuit 1405. This packet-available signal is transmitted as long as there is a complete packet in memory 1401.

Output circuit 1405 reads the packet bytes stored in memory 1401 by making sequential read requests to control 1404 via control bus 1412. Control 1404 maintains a pointer that determines which word in memory 1401 is associated with the packet to be transmitted into the network via output circuit 1405. Output circuit 1405 assembles accessed bytes into a serial bit stream representing a packet and transmits the packet at an 8 Mb/s rate. In order to transmit the packet to switching network 116, output circuit 1405 uses a logical address field from the original packet to address the logical translation table to obtain therefrom the switch destination address of the packet.

Figure 8:
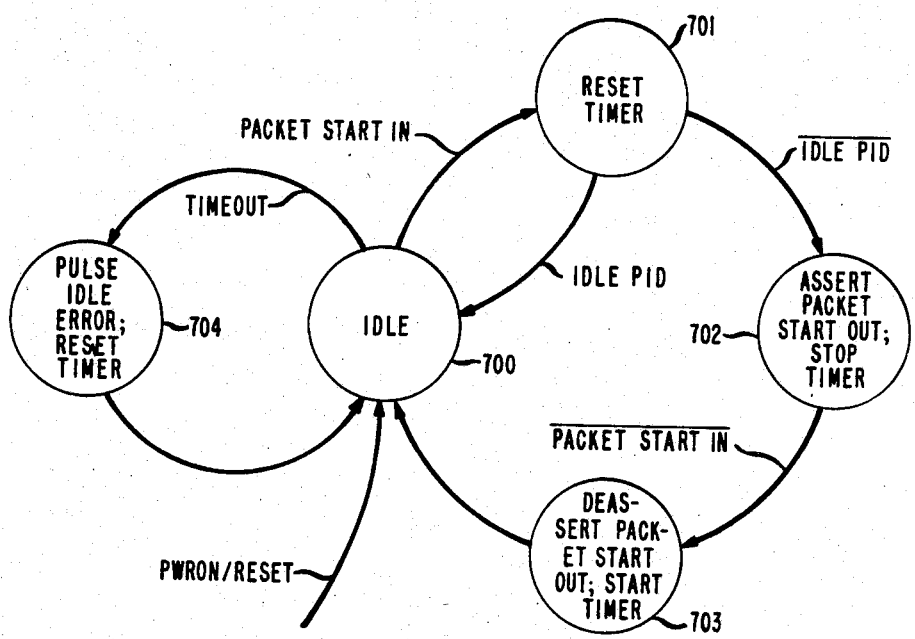
FIG. 8 is a block diagram of an idle packet.
Figure 9:
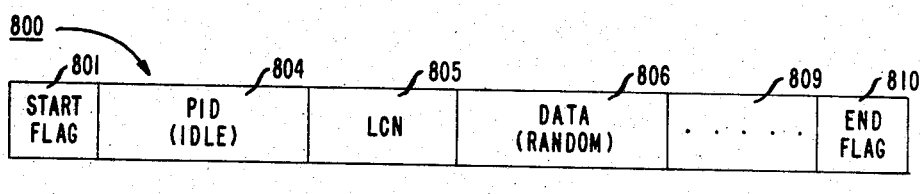

Turning to FIG. 8, there is shown the organization of an idle packet 800. The packet 800 is functionally divided into a plurality of fields 801–810 which correspond to the fields of conventional packets. The idle packet 800 begins with a start flag 801 and ends with an end flag 810. The start and end flags 801/810 are unique bit patterns used to identify the beginning and end of a packet. For purposes of this embodiment, the start and end flags are identical. A packet identifier (PID) 804 marks the type of packet. Types of packets include call setup packets, call termination packets, data packets, and idle packets. For purposes of this embodiment, the PID field 804 is eight bits wide, and an idle packet is marked with the bit sequence "00001111" therein. A logical channel number (LCN) 805 identifies the source address, i.e., the originator, of the packet. A data field 806 carries the data being transported by the packet. The data field 806 of the idle packet 800 carries idle data. For purposes of this embodiment, the data field 806 of the idle packet 800 carries a pseudo-random sequence of binary digits. The sequence is pseudo-random in that, even though the binary digits of the field 806 are random, binary digit sequences such as may have special meaning to link protocols are avoided. Illustratively, the contents of the field 806 are the same for all idle packets 800. Other fields 809, such as time stamps and error checking codes, may be included in the packet 800 as well.

Figure 4:
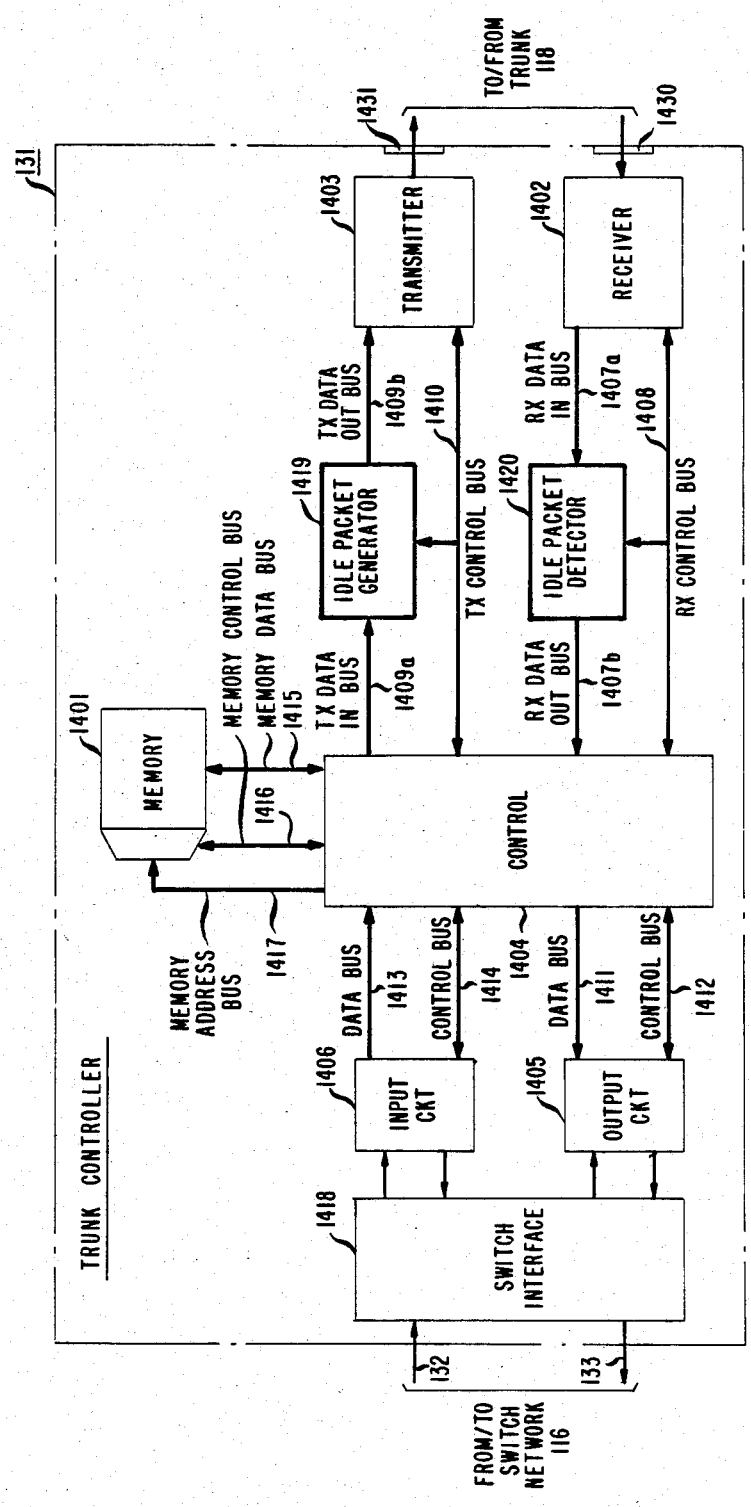
FIG. 4 is a block diagram of the idle packet generator of the trunk controller of FIG. 3.
Figure 5:
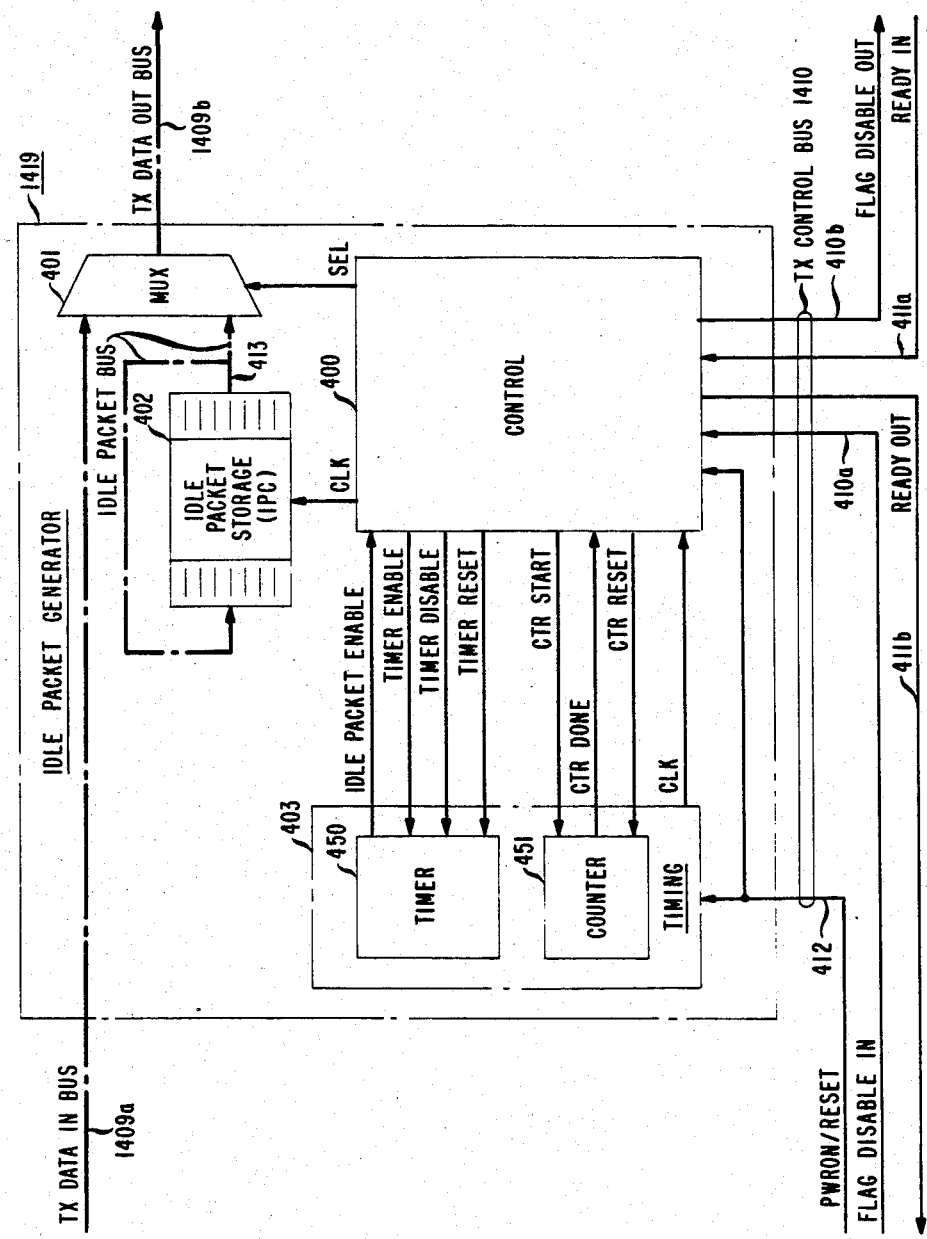
FIG. 5 is a state diagram of the control of the idle packet generator of FIG. 4.

The structure and operation of idle packet generator 1419 and idle packet detector 1420 will now be discussed in more detail, in conjunction with FIGS. 4-7. Turning to FIG. 4, there is shown in block diagram form the structure of the idle packet generator 1419. The generator 1419 includes idle packet storage 402, which is a memory that stores the idle packet 800, less flags 801 and 810. The idle packet storage 402 is a byte-wide first-in, first-out (FIFO) memory. It stores in sequence the plurality of bytes that make up the fields 804-809 of the idle packet 800. The output port of the storage 402 is connected by a byte-wide IDLE PACKET bus 413 to the input port of the storage 402 and to an input port of a multiplexer 401. A second input port of the multiplexer 401 is connected to the TX DATA IN bus 1409a. The output port of the multiplexer 401 is connected to the TX DATA OUT bus 1409b. Operation of the multiplexer 401 and storage 402 are controlled by a control 400 in conjunction with a timing circuit 403. The timing circuit 403 is a source of timing signals for the control 400. The control 400 is a state machine, whose operation is defined by the state diagram of FIG. 5.

Both the control 400 and the timing circuit 403 are connected to a PWRON/RESET signal line 412 of the TX CONTROL bus 1410. This line is asserted by the control 1404 of the trunk controller 131 upon powerup, and when the generator 1419 is being reinitialized. Assertion of the line 412 clears and resets the timing circuit 403 and places the control 400 in IDLE state 500 (see FIG. 5). In the state 500, the control 400 causes the multiplexer 401, via a SEL signal line, to connect the TX DATA IN bus 1409a to the TX DATA OUT bus 1409b, thus establishing a direct connection thereover between the control 1404 and the transmitter 1403.

The control 400 is also connected to a FLAG DISABLE IN signal line 410a and a FLAG DISABLE OUT signal line 410b of the TX CONTROL bus 1410. In the IDLE state 500 the control 400 monitors the line 410a which comes from the control 1404. While the control 1404 has no packets to send to the transmitter 1403, it maintains the line 410a deasserted. In response, the control 400 remains in the IDLE state 500, and maintains deasserted the line 410b which leads to the transmitter 1403, unless it receives an IDLE PACKET ENABLE signal from the timing circuit 403. While the line 410b is deasserted, the transmitter 1403 continuously generates and transmits an idle code sequence of flags 801/810.

The IDLE PACKET ENABLE signal is generated by an idle packet timer 450 of the timing circuit 403. Unless disabled, the timer 450 runs automatically when power is applied to the timing circuit 403. The timer 450 times the period between successive generations by the generator 1419 of the idle packet 800 during idle periods, i.e., while no other packets are available for transmission and hence the FLAG DISABLE IN signal line 410a is deasserted. When the timer 450 times out, it generates the IDLE PACKET ENABLE signal to indicate to the control 400 that it is time to generate an idle packet 800.

When the control 400 receives the IDLE PACKET ENABLE signal in the IDLE state 500, it responds by assuming state 501. In the state 501 the control 400 causes the multiplexer 401 to select, i.e., connect to its output port, the idle packet storage 402. At the same time the control 400 also asserts the FLAG DISABLE OUT signal line 410b.

When the transmitter 1403 senses assertion of the line 410b, it completes transmission of the idle flag 801/810 that it is currently transmitting, ceases transmission of further idle flags, and asserts a READY IN signal line 411a of the TX CONTROL BUS 1410 to indicate that it is ready to transmit a packet.

The control 400 is connected to and monitors the READY IN signal line 411a. When the control 400 detects assertion of the line 411a in the state 501, it responds by assuming a state 502. In the state 502 the control 400 gates clock signals, generated by the timing circuit 403, onto a CLK control line leading to the idle packet storage 402. At the same time the control 400 enables a counter 451 of the timing circuit 403. The counter 451 is incremented by the clock signals, and hence the counter 451 counts the number of clock signals gated to the idle packet storage 402 by the control 400.

Receipt of each clock signal on the CLK line causes the idle packet storage 402 to output a byte of the idle packet 800 onto the IDLE PACKET bus 413, the remaining bytes in the storage 402 to shift one position closer to the output port of the storage 402, and a byte present at the input port of the storage 402 to be stored in the storage 402. The bus 413 conducts each outputted byte both to the multiplexer 401 and to the input port of the storage 402, thereby causing the byte to be both conveyed to the transmitter 1403 and stored again by the storage 402.

As the transmitter 1403 begins to receive bytes of the fields 804-809 of the idle packet 800 from the idle packet generator 1419, it appends the start flag 801 thereto and immediately begins to transmit the idle packet 800.

The counter 451 is adapted to count as many clock cycles as there are bytes stored in the storage 402. When the counter 451 reaches this count, generation of the idle packet 800 on the bus 413 is completed, and the counter 451 issues a CTR DONE signal to the CONTROL 400.

Upon receiving the CTR DONE signal in the state 502, the control 400 enters state 503 and stops gating clock signals to the idle packet storage 402. Since the storage 402 received as many clock signals as it contains bytes, the whole idle packet 800 has been gated out of the storage 402 and has been both sent to the transmitter 1403 for transmission and stored again by the storage 402. In the state 503 the control also sends control signals to the timing circuit 403 to reset the counter 451 and to reset the timer 450. The timer 450 immediately begins to time a new inter-idle packet period. Also in the state 503, the control 400 causes the multiplexer 401 to reconnect the TX DATA IN bus 1409a to the TX DATA OUT bus 1409b, and deasserts the FLAG DISABLE OUT signal line 410b. The control 400 then resumes IDLE state 500.

Deassertion of the signal line 410b indicates to the transmitter 1403 that it has received the last byte of the idle packet 800. The transmitter 1403 therefore appends the end flag 810 thereto, completes transmission of the idle packet 800, and resumes transmission of the flags 801/810.

When the control 400 detects in the IDLE state 500 assertion of the FLAG DISABLE IN signal line 410a indicating that the control 1404 has a packet to send to the transmitter 1403, the control 400 first enters state 504 to check if it is receiving an IDLE PACKET ENABLE signal from the timer 450. If so, transmission of an idle packet 800 takes precedence and the control 400 assumes the state 501 and proceeds to cause an idle packet 800 to be transmitted, in the manner described above.

If, however, the IDLE PACKET ENABLE signal is not being generated by the timer 450, the control 400 proceeds from state 504 to state 505. In the state 505, the control 400 disables, i.e., stops, the timer 450 and asserts the FLAG DISABLE OUT signal line 410b to indicate to the transmitter 1403 that a packet is available for transmission.

The transmitter 1403 responds to assertion of the line 410b in the manner described above. When the control 400 finds the READY IN signal line 411b asserted by the transmitter 1403, it enters state 506 and asserts a READY OUT signal line 411b of the TX CONTROL bus 1410 leading to the control 1404 to inform the control 1404 of the transmitter 1403's readiness to transmit a packet.

The control 1404 responds by gating bytes of the packet on the TX DATA IN bus 1409a. As the bus 1409a is connected by the multiplexer 401 to the TX DATA OUT bus 1409b, the bytes reach the transmitter 1403. The transmitter 1403 responds thereto in the same manner as was described for the idle packet 800.

When the control 1404 completes gating out the last byte of the packet, it deasserts the FLAG DISABLE IN line 410a. The control 400 detects deassertion of the line 410a and responds thereto by entering state 507 wherein it deasserts the FLAG DISABLE OUT line 410b. The transmitter 1403 responds to deassertion of the line 410b in the manner described previously. In the state 507 the control 400 also reenables, i.e., restarts, the idle packet timer 450. The control 400 then returns to the IDLE state 500.

Figure 6:
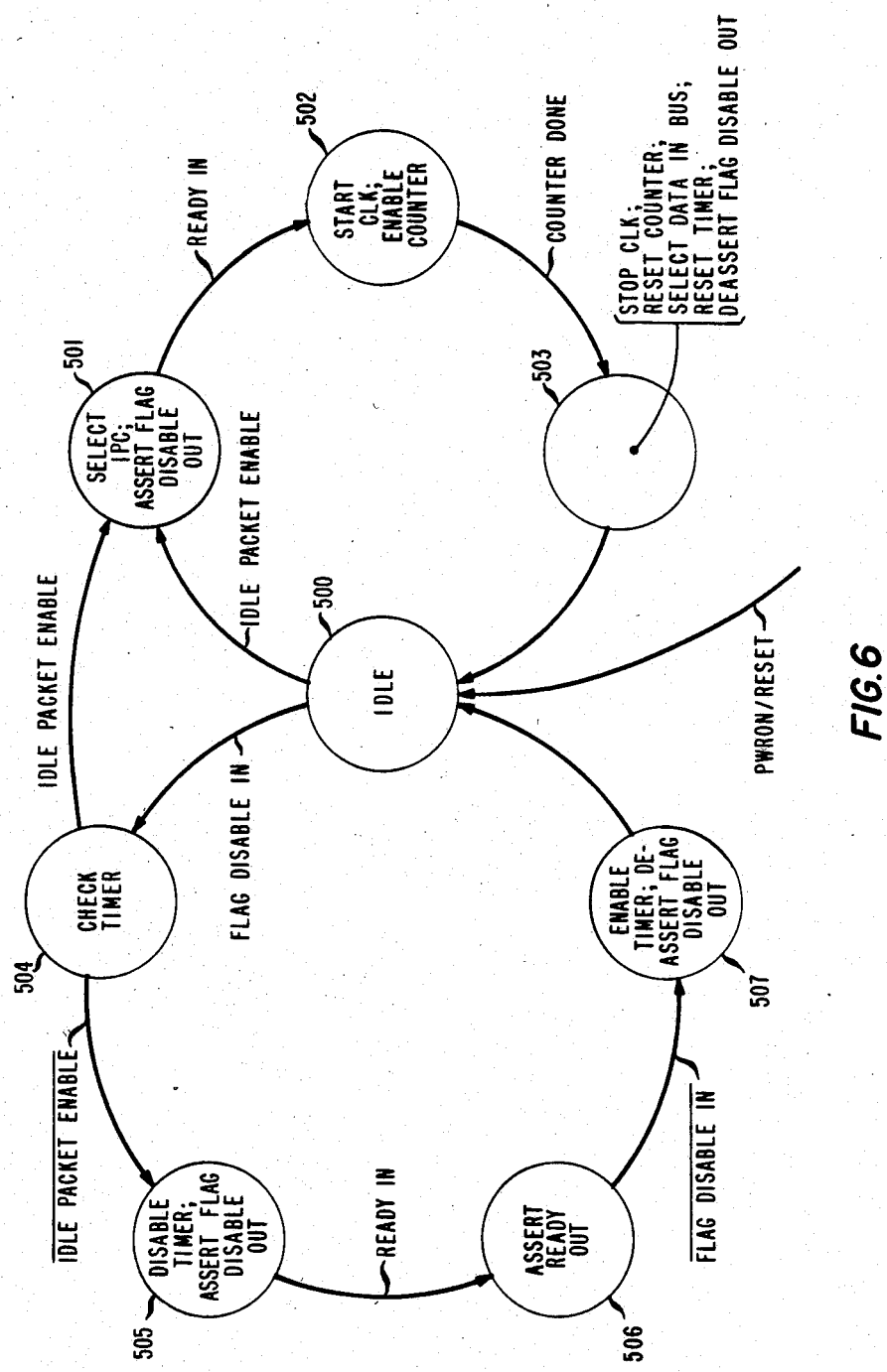
FIG. 6 is a block diagram of the idle packet detector of the trunk controller of FIG. 3.
Figure 7:
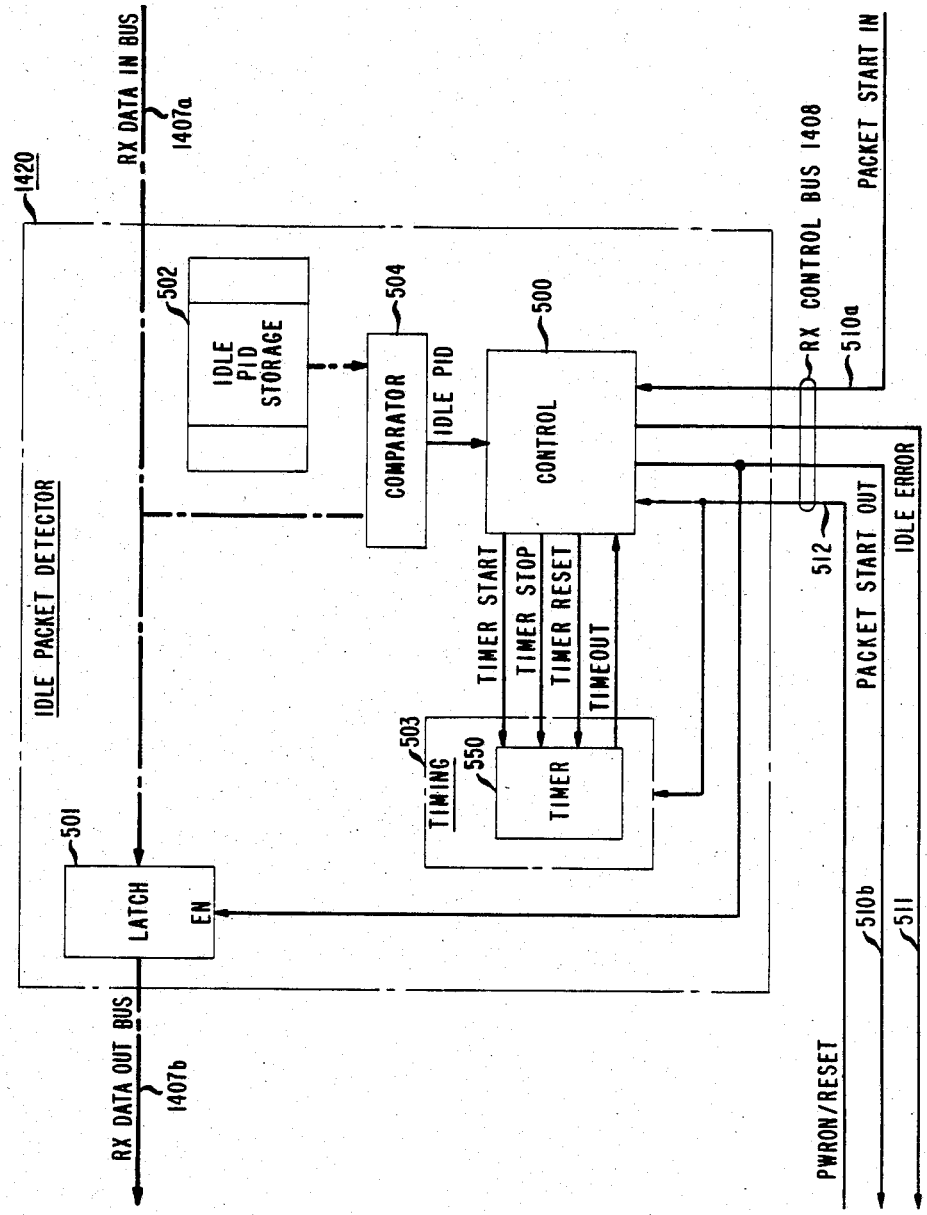
FIG. 7 is a state diagram of the control of the idle packet detector of FIG. 6.

The configuration of the idle packet detector 1420 is shown in block diagram form in FIG. 6. The detector 1420 includes idle PID storage 502. The storage 502 is a memory, such as a byte-wide register, which stores the PID of an idle packet 800. Hence the contents of the storage 502 duplicate the contents of the PID field 804 of the packet 800.

The output port of the storage 502 is connected to one input port of a comparator 504. The other port of the comparator 504 is connected to the RX DATA IN bus 1407a. The bus 1407a is also connected to a byte-wide latch 501. The output of the comparator 504 is connected to a control 500 which, in cooperation with a timing circuit 503, controls the operation of the idle packet detector 1420. The timing circuit 503 is a source of timing signals for the control 500. The control 500 is a state machine, whose operation is defined by the state diagram of FIG. 7.

The timing circuit 503 and the control 500 are connected to a PWRON/RESET signal line 512 of the RX CONTROL bus 1408. The line 512 is asserted by the control 1404 of the trunk controller 131 upon powerup, and when the detector 1420 is being reinitialized. Assertion of the line 512 clears and resets the timing circuit 503 and places the control 500 in IDLE state 700 (see FIG. 7). In the state 700, the control 500 disables the output of the latch 501, via a signal line leading to the latch's enable (EN) input, thus disconnecting the data path between the receiver 1402 and the control 1404.

The timing circuit 503 includes a timer 550 which times the maximum period of time permissible between receipt of idle packets 800 during idle periods, i.e., while other packets are not being received. The timer 550 automatically begins to run upon application of power to the idle packet detector 1420. When the timer 550 times out, it sends a TIMEOUT signal indicative thereof to the control 500.

In the IDLE state 700 the control 500 is responsive to the TIMEOUT signal from the timer 550. The control 500 responds thereto by entering state 704 and pulsing an IDLE ERROR signal line 511 of the RX CONTROL bus 1408 leading to the control 1404 to signal the control 1404 that an expected idle packet 800 has not been received. The control 1404 in turn sends a packet to the central processor 115 of the office 102 to inform it thereof. The central office 102 then undertakes appropriate maintenance activities, such as determining the usability of the trunk 118, rerouting communications previously proceeding over the trunk 118 over some other trunk, and informing the sources of those communications that an error has occurred in transmission of those communications.

Following pulsing of the IDLE ERROR signal line 511, the control 500 resets the timer 550 by sending a TIMER RESET signal thereto. The control 500 then resumes the IDLE state 700.

The control 500 is connected to a PACKET START IN signal line 510a of the RX CONTROL bus 1408 leading from the receiver. In the IDLE state 500, the control 500 monitors the line 510a.

During idle periods, while the receiver 1402 is receiving flags 801/810, the receiver 1402 identifies and discards the flags and keeps the line 510a deasserted. When the receiver 1402 begins to receive a packet, it asserts the signal line 510a to indicate reception of a packet. The receiver 1402 then outputs bytes of data representing the packet on the RX DATA IN bus 1407a. The first non-flag packet field received by the receiver 1402 is the PID field 804, and hence the first byte of data output by the receiver 1402 after assertion of the line 510a is the PID. The bus 1407a conducts the byte to both the comparator 504 and to the latch 501. The latch 501 latches the byte, but its output is disabled and hence the byte is blocked by the latch 501 from propagating to the RX DATA OUT bus 1407b.

The comparator 504 constantly compares the contents of the RX DATA IN bus 1407a with the idle PID contents of the IDLE PID storage 502. If the packet being received by the receiver is an idle packet 800, the comparator 504 detects a match between the contents of the bus 1407a and the storage 502, thereby identifying the packet as being an idle packet 800, and hence asserts the IDLE PID signal line connected to its output and leading to the control 500.

Upon detecting assertion of the signal line 510a, the control 500 enters state 701. Since assertion of the line 510a indicates that a packet has been received, the control 500 resets the timer 550. Also in the state 701 the control 500 is responsive to the output of the comparator 504. If the control 500 finds the IDLE PID signal line asserted, it returns to the idle state 700. The control 500 does not enable the output of the latch 501, and hence an idle packet 800 is blocked and discarded at the latch 501.

If, however, the control 500 finds the idle PID signal line not asserted in the state 701, indicating that a non-idle packet is being received, the control enters state 702. The control 500 is connected to the PACKET START OUT signal line 510b of the RX CONTROL bus 1408 leading to the control 1404, and in state 702 the control 500 asserts the line 510b to inform the control 1404 that bytes of a packet are incoming thereto over the RX DATA OUT bus 1407b.

The line 510b is also connected to the enable (EN) input of the latch 501. Assertion of the line 510b enables the output of the latch 501 and causes it to gate the byte latched thereby onto the bus 1407b. The line 510b remains asserted while the receiver 1402 is outputting bytes onto the bus 1407a, and hence the bytes propagate from the bus 1407a to the bus 1407b and thereby to the control 1404.

In the state 702 the control 500 also sends a TIMER STOP signal to the timer 550 to stop it from timing while a packet is being received.

After the receiver 1402 has output the last byte of the received packet onto the bus 1407a, the receiver 1402 deasserts the PACKET START IN line 510a. This causes the control 500 to assume state 703, in which it issues a TIMER START signal to the timer 550 to restart it, and deasserts the PACKET OUT signal line 510b. Deassertion of the line 510b both informs the control 1404 that it has received the whole packet and again disables the output of the latch 501, thereby disconnecting the RX DATA IN bus 1407a from the RX DATA OUT bus 1407b. The control 500 then returns to the IDLE state 700.

Of course, various changes and modifications to the illustrative embodiment described above will be apparent to those skilled in the art. For example, a sequence of signals other than the packet flags may be sent during idle periods. Or only the idle packet may be sent during idle periods, either continuously or periodically, depending upon system requirements, without transmission of any other sequence of signals during the idle period. Also, the idle packet generator and decoder may be implemented either as part of the trunk controller transmitter and receiver, respectively, or as part of the trunk controller control. Furthermore, the contents of the data field of the idle packet may be different for each individual, or group of, idle packets. Such changes and modifications can be made without departing from the spirit and scope of the invention and without diminishing its attendant advantages. It is therefore intended that such changes and modifications be covered by the following claims.

What is claimed is:

1. A packet switching system having a first and a second portion thereof interconnected for communication by a communication link, comprising:
   means associated with the first portion for transmitting on the link idle code when packets are not being transmitted thereon and further for occasionally transmitting on the link a packet of a first type; and
   means associated with the second portion for discarding both idle code and packets of the first type received on the link.

2. A packet switching system having a first and a second switching node interconnected for communication by a trunk, comprising:
   means for transmitting on the trunk idle code when packets are not being transmitted thereon; and
   means associated with the first node for occasionally transmitting on the trunk a packet of a first type when no other packets are available for transmission;
   means associated with the second node for discarding packets of the first type received on the trunk.

3. The system of claim 2 wherein the means for transmitting a packet of the first type comprise:
   means for occasionally generating a packet of the first type for transmission on the trunk; and wherein the means for transmitting idle code comprise:
   means associated with the first node and cooperative with the generating means for transmitting on the trunk idle code when not transmitting packets thereon and further for transmitting on the trunk the generated packet.

4. The system of claim 2 wherein the discarding means comprise:
   means for identifying packets of the first type received on the trunk; and
   means responsive to the identifying means for discarding received packets identified as being of the first type.

5. The system of claim 4 wherein the discarding means further comprise:
   means for receiving on the trunk idle code and packets transmitted by transmitting means associated with the first node.

6. A packet switching system having a first and a second switching node interconnected for communication by a trunk, comprising:
   means for generating packets marked as idle packets;
   means cooperative with the generating means for periodically transmitting from the first node on the trunk a generated idle packet when other packets are not available for transmission and further for transmitting from the first node on the trunk idle code when packets are not being transmitted thereon from the first node;
   means for receiving at the second node packets and idle code transmitted on the trunk from the first node and further for discarding the idle code;
   means cooperative with the receiving means for identifying received idle packets; and
   means responsive to the identifying means for discarding received packets identified as idle packets.

7. The system of claim 6 wherein the generating means comprise:
   means for generating packets each including idle data and an idle packet identifier.

8. The system of claim 7 wherein the identifying means comprise:

means for inspecting the identifier of received packets to identify idle packets.

9. The system of claim 6 wherein the generating means comprise:
means for generating periodically when packets are not available for transmission a packet marked as an idle packet and including idle data.

10. The system of claim 6 wherein the transmitting means further comprise
means for generating for transmission on the trunk idle code when packets are not available for transmission from the first node.

11. The system of claim 6 further comprising:
means responsive to the receiving means and to the identifying means for signalling error when an idle packet is not periodically identified while other packets are not being received.

12. A packet switching node having a port for connecting to a communication trunk, comprising:
means for transmitting at the port idle code when packets are not being transmitted thereat and further for occasionally transmitting at the port a packet of a first type; and
means for discarding both idle code and packets of the first type received at the port.

13. The node of claim 12 wherein the transmitting means comprise:
means for occasionally generating a packet of a first type; and
means cooperative with the generating means for transmitting at the port the generated packet.

14. The node of claim 12 wherein the discarding means comprise:
means for identifying packets of the first type received at the port; and
means responsive to the identifying means for discarding received packets identified as being of the first type.

15. The node of claim 14 wherein the discarding means further comprise:
means for receiving packets and idle code at the port.

16. A packet switching node having a port for connecting to a communication trunk, comprising:
means for generating packets marked as idle packets;
means cooperative with the generating means for periodically transmitting at the port a generated idle packet when other packets are not available for transmission and further for transmitting at the port idle code when packets are not being transmitted thereat;
means for receiving idle code and packets at the port;
means cooperative with the receiving means for identifying received idle packets; and
means responsive to the identifying means for discarding received packets identified as idle packets.

17. The node of claim 16 wherein the generating means comprise:
means for generating packets each including idle data and an idle packet identifier.

18. The node of claim 17 wherein the identifying means comprise:
means for inspecting the identifier of received packets to identify idle packets.

19. The node of claim 16 wherein the generating means comprise:
means for generating periodically when packets are not available for transmission a packet marked as an idle packet and including idle data.

20. The node of claim 16 wherein the receiving means further comprise
means for receiving at the port and discarding idle code.

21. The node of claim 16 further comprising:
means responsive to the receiving means and to the identifying means for signalling error when an idle packet is not periodically identified while other packets are not being received.

22. A trunk controller for a packet switching system, the controller having a port for connecting to a communication trunk, comprising:
means for transmitting at the port idle code when packets are not being transmitted on the trunk and further for occasionally transmitting at the port a packet of a first type; and
means for discarding packets of the first type received at the port.

23. The controller of claim 22 wherein the transmitting means comprise:
means for occasionally generating a packet of a first type; and
means cooperative with the generating means for transmitting at the port the generated packet.

24. The controller of claim 22 wherein the discarding means comprise:
means for identifying packets of the first type received at the port; and
means responsive to the identifying means for discarding received packets identified as being of the first type.

25. The node of claim 24 wherein the discarding means further comprise:
means for receiving at the port packets and idle code and further for discarding the received idle code.

26. A trunk controller for a packet switching system, the controller having a port for connecting to a communication trunk, comprising:
means for generating packets marked as idle packets;
means cooperative with the generating means for periodically transmitting at the port a generated idle packet when other packets are not available for transmission and further for transmitting at the port idle code when packets are not being transmitted thereat;
means for receiving both packets and idle code at the port and for discarding the idle code;
means cooperative with the receiving means for identifying received idle packets; and
means responsive to the identifying means for discarding received packets identified as idle packets.

27. The controller of claim 26 wherein the generating means comprise:
means for generating packets each including idle data and an idle packet identifier.

28. The controller of claim 27 wherein the identifying means comprise:
means for inspecting the identifier of received packets to identify idle packets.

29. The controller of claim 26 wherein the generating means comprise
means for generating periodically when packets are not available for transmission a packet marked as an idle packet and including idle data.

30. The controller of claim 26 further comprising:
means responsive to the receiving means and to the identifying means for signalling error when an idle packet is not periodically identified while other packets are not being received.

31. A method of signalling in a packet switching system between a first and a second portion thereof interconnected for communication by a communication link, comprising the steps of:
  transmitting idle code on the link while packets are not being transmitted thereon;
  occasionally transmitting from the first portion on the link a packet of a first type; and
  discarding packets of the first type received on the link at the second portion.

32. A method of signalling in a packet switching system between a first and a second switching node interconnected for communication by a trunk, comprising the steps of:
  transmitting idle code on the trunk from the first node while packets are not being transmitted thereon;
  occasionally transmitting from the first node on the trunk a packet of a first type;
  discarding idle code received on the trunk at the second node; and
  discarding packets of the first type received on the trunk at the second node.

33. The method of claim 32 wherein the step of transmitting includes the steps of:
  occasionally generating a packet of the first type; and
  transmitting a packet on the trunk the generated packet.

34. The method of claim 32 wherein the step of discarding packets includes the steps of:
  identifying packets of the first type received on the trunk; and
  discarding received packets identified as being of the first type.

35. The method of claim 34 wherein the steps of discarding are preceded by the step of:
  receiving both idle code and packets transmitted on the trunk from the first node.

36. A method of idle period signalling in a packet switching system between a first and a second switching node interconnected for communication by a trunk, comprising the steps of:
  transmitting idle code on the trunk from the first node while packets are not being transmitted thereon;
  generating a packet marked as an idle packet;
  periodically transmitting from the first node on the trunk the generated idle packet when other packets are not available for transmission;
  receiving at the second node idle code transmitted on the trunk from the first node;
  discarding the received idle code;
  receiving at the second node a packet transmitted on the trunk from the first node;
  identifying the received packet as an idle packet; and
  discarding the identified idle packet.

37. The method of claim 36 wherein the step of generating comprises the step of:
  generating a packet including idle data and an idle packet identifier.

38. The method of claim 37 wherein the step of identifying comprises the step of:
  inspecting the identifier of the received packet to identify an idle packet.

39. The method of claim 37 wherein the step of generating comprises the step of:
  generating periodically when packets are not available for transmission a packet marked as an idle packet and including idle data.

40. The method of claim 37 further comprising the step of:
  signalling error when an idle packet is not identified periodically while other packets are not being received.

* * * * *

UNITED STATES PATENT AND TRADEMARK OFFICE
CERTIFICATE OF CORRECTION

PATENT NO. : 4,646,287

DATED : February 24, 1987

INVENTOR(S) : Mikiel L. Larson, Anne A. Robrock and Wing N. Toy

It is certified that error appears in the above-identified patent and that said Letters Patent is hereby corrected as shown below:

Column 15, line 27, "transmitting" should read --transmitting a packet--.

Column 15, line 29, "transmitting a packet" should read --transmitting--.

Signed and Sealed this

Eighth Day of September, 1992

Attest:

DOUGLAS B. COMER

*Attesting Officer*   *Acting Commissioner of Patents and Trademarks*